UNITED STATES PATENT OFFICE.

LUDWIG TAUB, OF ELBERFELD, GERMANY, ASSIGNOR TO FARBENFABRIKEN VORM. FRIEDR. BAYER & CO., OF ELBERFELD, GERMANY, A CORPORATION OF GERMANY.

DISINFECTING AGENT.

1,034,166.  Specification of Letters Patent.  Patented July 30, 1912.

No Drawing.  Application filed January 27, 1912. Serial No. 673,795.

*To all whom it may concern:*

Be it known that I, LUDWIG TAUB, doctor of philosophy, chemist, citizen of the German Empire, residing at Elberfeld, Germany, have invented new and useful Improvements in New Disinfecting Agents, of which the following is a specification.

It has been observed that the salts of the hitherto unknown mercuric compounds of substituted benzoic acids containing 2 or more substituents, especially alkyl-, halogen-, alkoxy- or alkyl-halogen-benzoic acids substituted in the nucleus have a disinfectant power, superior in many cases to that of sublimate, especially in the presence of soap or of serum. The above-mentioned compounds are therefore therapeutically valuable products.

The new bodies containing in their molecule the characteristic group

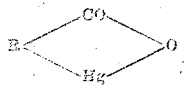

where R stands for a benzene radical substituted by two or more substituents such as those above indicated, are obtained by treating the corresponding acids with mercuric oxid or mercuric salts at higher temperatures or by heating e. g. the mercuric salts of the acids in presence or absence of fusion agents or solvents. The new products are whitish crystalline compounds which are soluble in dilute alkalies forming salts and insoluble in alcohol, ether and benzene. On being boiled with hydrochloric acid they are split up, $HgCl_2$ being produced.

In order to illustrate the new process more fully the following examples are given, the parts being by weight:—

Example 1: 100 parts of 1.4-dimethyl-2-benzoic acid are well mixed with 40 parts of mercuric oxid and heated in an oil bath at from 130–140° C. until a test portion of the melt forms a clear solution with caustic soda lye. After cooling the mixture is extracted with alcohol and dissolved in highly diluted caustic soda lye in order to remove the excess of acid. By passing carbonic acid through the solution the anhydrid of the oxy-mercuric-dimethylbenzoic acid

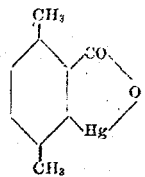

is precipitated as a fine white crystalline powder. It is almost insoluble in water and the usual organic solvents, but it is very easily soluble in alkalies forming the corresponding salts. By heating it with hydrochloric acid the compound is split up into dimethyl-benzoic acid and mercuric chlorid. On being heated it is decomposed without melting. Trimethyl- or other dimethylbenzoic acids or veratric acid (3.4-dimethoxy-benzoic acid) can be used.

Example 2: 100 parts of 3.5-dibromo-benzoic acid and 60 parts of mercuric acetate are heated in an oil bath to from 130–140° C. until a test portion forms a clear solution with caustic soda lye. In order to remove the excess of acid the cooled mass is treated with dilute alkali and for this purpose the melt is dissolved in highly diluted caustic soda, care being taken to avoid an excess and the solution is then filtered. By passing carbonic acid through the solution the anhydrid of oxymercuric-dibromo-benzoic acid

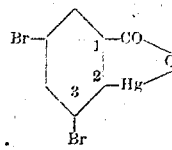

is precipitated as a white crystalline powder. It does not differ in its properties from the compound described according to Example 1. Also other of the above mentioned acids can be used, e. g. 1.2-dimethyl-5-bromo-4-benzoic acid.

I claim:—

1. The herein described mercuric compounds of benzoic acids substituted in the nucleus by more than one substituent containing in their molecule the characteristic group

in which R stands for a substituted benzol radical, which are crystalline compounds soluble in dilute alkalies forming salts, insoluble in alcohol, ether and benzene, splitting off $HgCl_2$ on being boiled with hydrochloric acid; and being valuable disinfectants, substantially as described.

2. The herein described mercuric compounds of benzoic acids substituted in the nucleus by more than one substituent containing in their molecule the characteristic group

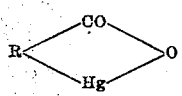

in which R stands for an alkyl substituted benzene radical, which are crystalline compounds soluble in dilute alkalies forming salts, insoluble in alcohol, ether and benzene, splitting off $HgCl_2$ on being boiled with hydrochloric acid; and being valuable disinfectants, substantially as described.

3. The herein described mercuric compounds of benzoic acids substituted in the nucleus by more than one substituent containing in their molecule the characteristic group

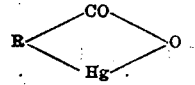

in which R stands for a di-alkyl substituted benzene radical, which are crystalline compounds soluble in dilute alkalies forming salts, insoluble in alcohol, ether and benzene, splitting off $HgCl_2$ on being boiled with hydrochloric acid; and being valuable disinfectants, substantially as described.

4. The herein described oxy-mercuric-dimethyl-benzoic acid anhydrid obtainable by heating dimethylbenzoic acid with mercuric oxid, which is a white crystalline powder soluble in dilute alkalies, insoluble in alcohol, ether and benzene, being split up into dimethylbenzoic acid and mercuric chlorid on being boiled with hydrochloric acid; and being a valuable disinfectant, substantially as described.

In testimony whereof I have hereunto set my hand in the presence of two subscribing witnesses.

LUDWIG TAUB. [L. S.]

Witnesses:
 HELEN NUFER,
 A. NUFER.